No. 635,337. Patented Oct. 24, 1899.
F. W. MONROE.
LAWN SPRINKLER.
(Application filed Jan. 30, 1899.)
(No Model.)

Witnesses:
G. S. Noble.
Louis Chase.

Inventor,
Frank W. Monroe,
By
T. Benjamin
Att'y.

THE NORRIS PETERS CO., PHOTO-LITHO., WASHINGTON, D. C.

UNITED STATES PATENT OFFICE.

FRANK W. MONROE, OF LA GRANGE, ILLINOIS.

LAWN-SPRINKLER.

SPECIFICATION forming part of Letters Patent No. 635,337, dated October 24, 1899.

Application filed January 30, 1899. Serial No. 703,846. (No model.)

*To all whom it may concern:*

Be it known that I, FRANK W. MONROE, a citizen of the United States, residing at La Grange, in the county of Cook and State of Illinois, have invented certain new and useful Improvements in Lawn-Sprinklers, of which the following is a specification.

My invention relates to that class of sprinkling devices that is adapted to be attached to a hose-pipe and placed on a lawn or in a garden or orchard where it may be desired to distribute jets of water over wide areas.

The especial objects of my invention are to provide a sprinkler in which the sprinkler-head may be elevated to a considerable height and set at any angle, in which provision is made not only for receiving the sand or other solids that may be in the water, but in which such substances will be directed or deflected into the receptacle, in which by suitable antifrictional means the minimum amount of force from the water will be required to rotate the sprinkling tubes or nozzles, in which the water may be quickly and easily reduced or divided from a solid stream to jets of any size or sprays of any degree of fineness, in which the jets may be thrown in any desired direction, thus adapting it for use economically as a sprayer of liquid insecticides, in which the accumulated sand and grit may be easily and quickly removed, and in attaining all of these objects in a simple and economical appliance.

Figure 1:
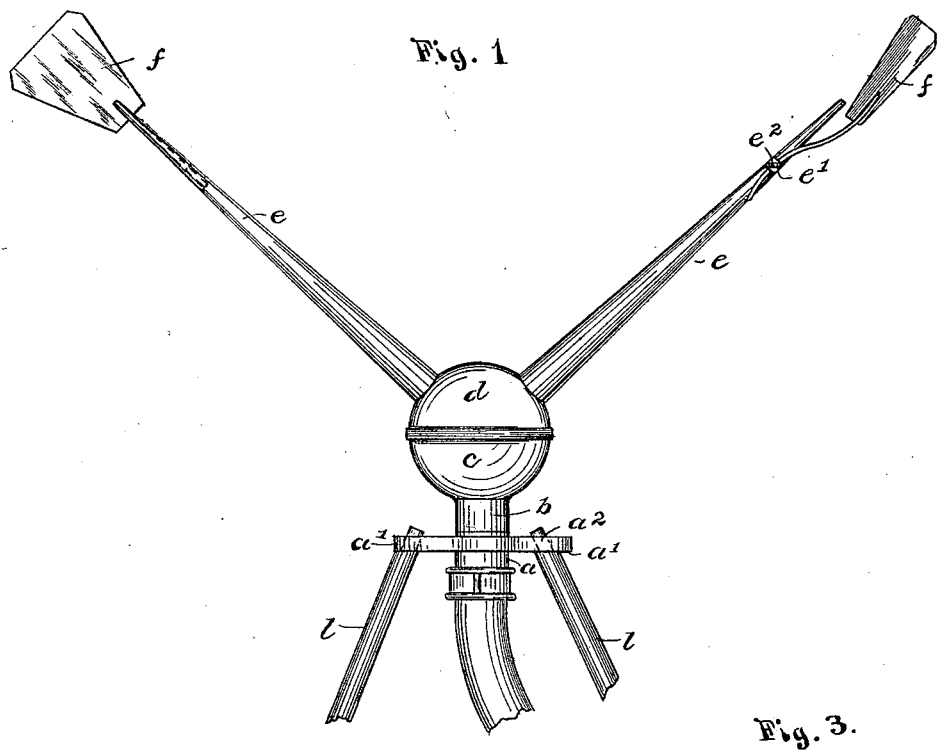
Figure 2:
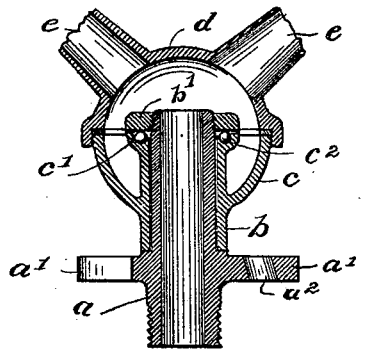
Figure 3:
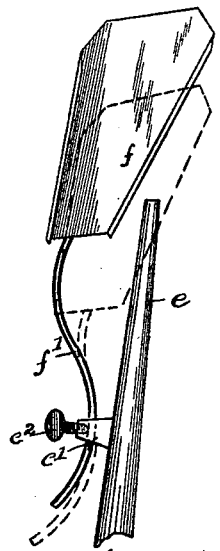

In the drawings accompanying this application and forming a part thereof, Figure 1 is an elevation of my invention, only a portion of the legs or supports being shown. Fig. 2 is a vertical section of the sprinkler-head, and Fig. 3 is a detail of the spraying device connected with the nozzles.

By reference to the drawings, $a$ represents a cylindrical tube or pipe, the lower end of which is threaded to receive the coupling at the end of an ordinary hose-pipe. This tube is formed with arms $a'$, extending at right angles therefrom, said arms being perforated, as at $a^2$, to receive the upper ends of supporting standards or legs $l$, of which there are three preferably used, though only two are shown in the drawings. These legs are straight round rods of comparatively small diameter from three to eight feet long and have their lower ends stuck into the ground when the sprinkler is in use.

Rotatably mounted on the portion of the tube above the arms $a'$ is a sleeve $b$, which is formed with two annular flanges $c$ and $c'$. The latter is around the upper edge of the sleeve and has formed therein a groove which constitutes a seat for antifrictional balls. The flange $c$ extends from the sleeve about midway between its ends, is hemispherical in shape, and is exteriorly threaded around its edge.

The upper end of the tube $a$ is exteriorly threaded to receive a lock-nut $b'$, the under face of which contacts with the balls when the nut is screwed down to its seat, thus forming a bearing for said balls and preventing the sleeve $b$ from being thrown from the tube by the force of the water.

Screwed onto the threaded portion of the flange $c$ is a hemispherical plate $d$, from which diverge at approximately right angles to each other two nozzles $e\ e$, which may be formed as part of the plate $d$, as shown, or screwed thereinto. These nozzles are made gradually tapering in order to reduce the size of the stream at the outlet with the minimum resistance to the water-pressure. Near the outer ends of the nozzles is secured a bracket $e'$, in which there is a threaded opening to receive a thumb-screw $e^2$, and at right angles to said opening a second and unthreaded opening to receive the stem $f'$ of the sprayer-plate $f$. The latter is made of thin flat metal, and the stem is made of wire bent in the curved form shown. As shown in Fig. 3, the sprayer-plate may be adjusted at various distances from the end of the nozzle by moving the stem longitudinally through the bracket, and it may be set at any angle to the nozzle by turning the stem on its axis.

It should be noted that the portion of the plate $d$ between the nozzles $e$ and directly above the end of the tube $a$ is curved downwardly, and that because of this contour any sand or solids striking against the plate will be deflected into the lower portion of the spherical head or cup formed by the flange $c$, from whence they may be removed from time to time, as required.

For the purpose of effecting a tight joint between the upper and lower sections of the spherical head a suitable gasket is interposed therebetween at the point of union.

In the use of my improved sprinkler the legs *l* are inserted in the ground to a depth depending on the elevation desired for the sprinkler-head, and the latter is adjusted to the legs by placing the arms *a'* over the upper ends of the legs. If it be desired to have the head set at an angle so that the streams from both nozzles will be directed to one side, it is only necessary to sink one of the legs farther into the ground than the other two.

Having thus described my invention, what I claim as new, and desire to secure by Letters Patent, is—

1. In a sprinkler, a rotatable sprinkler-head, composed of hemispherical plates, forming respectively a sand-cup and a sand-deflector, a water pipe or tube connected with said head, and ball-bearings arranged between the pipe and head, substantially as described.

2. In a sprinkler, a rotatable sprinkler-head, composed of hemispherical plates, forming respectively a sand-cup and a sand-deflector, nozzles extending radially from said head, a water pipe or tube connected with said head, and ball-bearings arranged between the pipe and head, substantially as set forth.

3. In a sprinkler, a rotatable sprinkler-head, composed of hemispherical plates, forming respectively a sand-cup and sand-deflector, nozzles extending radially from said head, adjustable spraying-plates on said nozzles, a water-pipe communicating with said head, and ball-bearings between said pipe and head.

In testimony whereof I affix my signature in presence of two witnesses.

FRANK W. MONROE.

Witnesses:
L. HANKE,
J. BUEHLER.